US007218444B2

(12) United States Patent
Cook

(10) Patent No.: US 7,218,444 B2
(45) Date of Patent: May 15, 2007

(54) DUAL-BAND, DUAL-FOCAL-LENGTH, RELAYED REFRACTIVE IMAGER

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 177 days.

(21) Appl. No.: 10/838,824

(22) Filed: May 3, 2004

(65) Prior Publication Data

US 2005/0243411 A1    Nov. 3, 2005

(51) Int. Cl.
G02B 23/12 (2006.01)
G02B 13/14 (2006.01)
G02B 23/00 (2006.01)
G02B 15/02 (2006.01)

(52) U.S. Cl. ............... 359/353; 359/357; 359/423; 359/674

(58) Field of Classification Search ........ 359/363, 359/672, 674, 679, 682, 689, 421, 423, 432, 359/353, 354, 357
See application file for complete search history.

(56) References Cited

U.S. PATENT DOCUMENTS

| 3,466,113 A | 9/1969 | Bertele |
| 3,674,334 A | 7/1972 | Offner |
| 3,947,084 A | 3/1976 | Noyes |
| 4,099,844 A | 7/1978 | Bertele |
| 4,380,363 A * | 4/1983 | Fjeldsted ............ 359/357 |
| 4,486,069 A * | 12/1984 | Neil et al. ............ 359/353 |
| 4,585,314 A | 4/1986 | Tateoka |
| 4,989,962 A * | 2/1991 | Kebo ............ 359/354 |
| 5,583,338 A | 12/1996 | Goodwin |
| 6,018,414 A | 1/2000 | Chipper |
| 6,174,061 B1 | 1/2001 | Cooper |
| 6,359,681 B1 | 3/2002 | Housand et al. |
| 6,423,969 B1 | 7/2002 | Amon |

FOREIGN PATENT DOCUMENTS

| EP | 0-365-208 | 4/1990 |
| GB | 2-102-588 | 2/1983 |

* cited by examiner

*Primary Examiner*—Alessandro Amari
(74) *Attorney, Agent, or Firm*—Leonard A. Alkov

(57) ABSTRACT

An imaging device includes a refractive imager lying in an optical path, and optionally a telescope that directs the optical path to the refractive imager. The refractive imager includes a first lens group that forms an intermediate image of a scene on the optical path, wherein the first lens group includes a first-lens-group positive-power lens, and a first-lens-group negative-power lens. A second lens group relays the intermediate image to a final image surface on the optical path, wherein the second lens group includes a second-lens-group positive-power lens, and a second-lens-group negative-power lens. A third lens group may be selectively inserted into the optical path between the first lens group and the second lens group and selectively removed from the optical path. The third lens group includes a third-lens-group positive-power lens, and a third-lens-group negative-power lens.

25 Claims, 3 Drawing Sheets

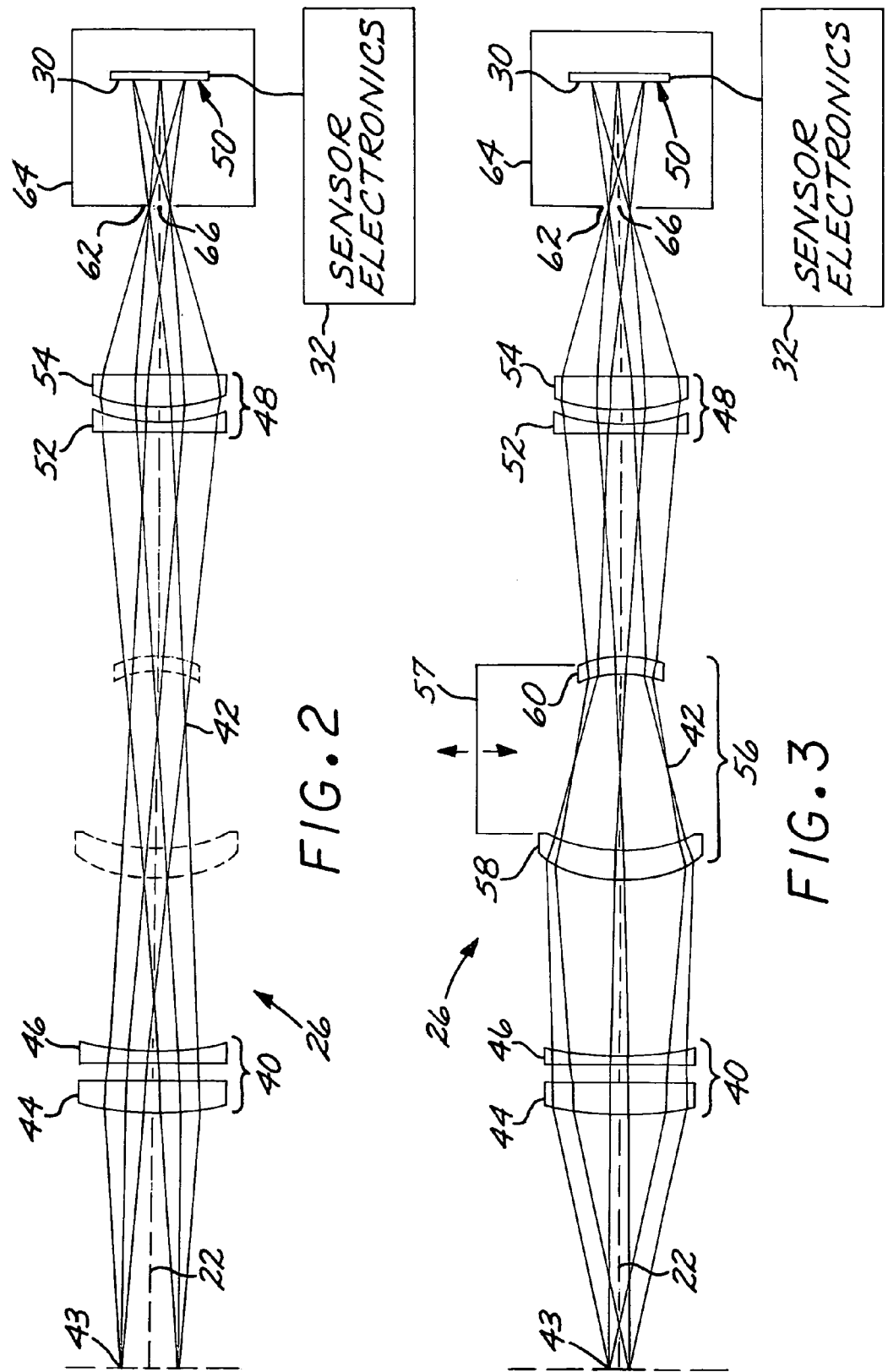

| SURF | ELEMENT | RADIUS | CONIC | THICKNESS | MATERIAL |
|---|---|---|---|---|---|
| 1 | ENTRANCE PUPIL | INF | | 2.237 | AIR |
| 2 | GROUP 1; + | 3.709 | -1.1227 | 0.268 | ZnSe |
| 3 | (LENS 44) | 182.315 | | 0.157 | AIR |
| 4 | GROUP 1; - | -63.446 | | 0.107 | BaF$_2$ |
| 5 | (LENS 46) | 6.38 | | 1.481 | AIR |
| 6 | GROUP 3; + | 1.177 | -0.166 | 0.268 | AMTIR1 |
| 7 | (LENS 58) | 1.505 | | 1.597 | AIR |
| 8 | GROUP 3; - | -0.615 | | 0.107 | As$_2$S$_3$ |
| 9 | (LENS 60) | -1.042 | 0.5167 | 1.924 | AIR |
| 10 | GROUP 2; - | 7.065 | | 0.107 | BaF$_2$ |
| 11 | (LENS 52) | 2.255 | | 0.125 | AIR |
| 12 | GROUP 2; + | 2.082 | -2.1448 | 0.294 | ZnSe |
| 13 | (LENS 54) | -7.839 | | 1.444 | AIR |
| 14 | COLD STOP (52) | INF | | 1.130 | AIR |
| 15 | IMAGE SURFACE (50) | INF | | | |

PARAMETER  NFOV     WFOV
APERTURE   0.572    0.200
FOCAL LENGTH 3.08   1.07
F/NO       F/5.33   F/5.33
FOV        11.66    33.06
FORMAT     0.504X0.378   0.504X0.378

MWIR: 3.7-4.7 MICRONS
LWIR: 8.1-8.7 MICRONS
FIELD SWITCH RATIO = 2.86X

FIG. 4

DUAL-BAND, DUAL-FOCAL-LENGTH, RELAYED REFRACTIVE IMAGER

This invention relates to an optical device and, more particularly, to a refractive imager that is operable for more than one wavelength band and operable to selectively produce more than one focal length and field of view.

BACKGROUND OF THE INVENTION

Imaging devices such as imaging sensor systems typically include an imaging sensor, and optics through which the optical path from the viewed scene passes to reach the imaging sensor. The optics serve to provide the desired focal length and field of view of the scene, and to focus the image onto the imaging sensor. In some applications, it is desirable that the optical system selectively provide two or more fields of view, such as a wide-angle field of view for general searching of a large area, and a narrow-angle field of view for higher-magnification, more-specific analysis of a small portion of the scene that is found to be of interest.

The imaging sensor may be selected for viewing any desired wavelength range, and imaging sensors are known for use in different wavelength ranges. Such wavelength ranges include, for example, wavelengths in the visible, the near infrared, the medium-wavelength infrared, and/or the long-wavelength infrared. Infrared sensors are typically cooled to cryogenic temperatures for optimal performance. The optics of the imaging sensor system must be compatible with the cold shielding required by the sensor, when such a cryogenic sensor is used.

In an application of interest, an imaging device requires imaging in two or more fields of view, with a straightforward approach for switching between the two fields of view. The imaging must be accomplished in two or more infrared wavelength ranges using a sensor that is cooled to the cryogenic range. Although it is conceivable to move the imaging sensor along the beam path when the field of view is switched, it is far preferable that both the focal surface of the optics and the cold stop of the cryogenic shielding remain at a fixed location when the field of view is switched. The imaging sensor, the cooling structure, and the associated cold stop may therefore remain at a fixed location along the beam path. No such imaging device is currently available, and there is a need for such an imaging device. The present invention fulfills this need, and further provides related advantages.

SUMMARY OF THE INVENTION

The present invention provides an imaging device in the form of an imaging sensor system. This imaging device operates in two (or more) wavelength bands and with two (or more) focal lengths (and fields of view) of the optics. The lens count is relatively low, resulting in reduced manufacturing costs, ease of alignment, and improved stability of the optics. The optics may be designed so that the locations of the image surface and the cold stop do not change when the focal length and field of view are changed. Consequently, the imaging sensor, the cold stop, and the cooling structure need not be moved axially parallel to the optical path when the field of view is changed.

In accordance with the invention, an imaging device comprises a refractive imager lying in an optical path and comprising a first lens group that forms an intermediate image of a scene on the optical path. The first lens group comprises a first-lens-group positive-power lens, and a first-lens-group negative-power lens. The refractive imager further includes a second lens group that relays the intermediate image to a final image surface on the optical path. The second lens group comprises a second-lens-group negative-power lens, and a second-lens-group positive-power lens. There is a third lens group that may be selectively and switchably inserted into the optical path between the first lens group and the second lens group and selectively and switchably removed from the optical path. The third lens group comprises a third-lens-group positive-power lens, and a third-lens-group negative-power lens. There may be other optical components, such as a foreoptics positioned on the optical path between the scene and the first lens group.

Desirably, the refractive imager is constructed so that the locations of the final image surface, the exit pupil, the cold shield, and the cold stop along the optical path are unchanged when the third lens group is inserted into the optical path and when the third lens group is removed from the optical path. To further this end, the first-lens-group positive-power lens may lie on the optical path between the scene and the first-lens-group negative-power lens; the second-lens-group positive-power lens may lie between the second-lens-group negative-power lens and the final image surface; the third-lens-group positive-power lens may lie on the optical path between the first lens group and the intermediate image, when the third lens group is inserted into the optical path; and the third-lens-group negative-power lens may lie on the optical path between the intermediate image and the second lens group, when the third lens group is inserted into the optical path.

There is typically an imaging sensor positioned at the final image surface. The imaging sensor may be a dual-wavelength (also termed "dual-color") sensor that operates in more than one wavelength range. An example is an HgCdTe detector that operates in both the medium-wavelength infrared (MWIR, 3–5 micrometers wavelength) and long-wavelength infrared (LWIR, 8–12 micrometers wavelength) ranges, and subranges thereof, used in conjunction with the appropriate spectral filter(s).

When the dual-wavelength imaging sensor is used, the materials of construction of the lenses are selected so that the focal surface is the same for the two wavelength ranges. Preferably, at least one (and more preferably both) of the first-lens-group positive-power lens and the second-lens-group positive-power lens is made of zinc selenide. Preferably, at least one (and more preferably both) of the first-lens-group negative-power lens and the second-lens-group negative-power lens is made of barium fluoride. Preferably, the third-lens-group positive-power lens is made of Amtir1, and the third-lens-group negative-power lens is made of arsenic trisulfide.

The present approach provides an optics system that permits switching between two different focal lengths and fields of view (or more than two different focal lengths and field of view if additional optical components are present). The focal plane and cold stop of the imaging sensor are unchanged when the third lens group is inserted into the optical path and when the third lens group is removed from the optical path, accomplishing the switching between the two different focal lengths. That is, the imaging sensor and its cold shield need not be moved along the optical path when the focal length is changed by insertion or removal of the third lens group. The lenses and their materials of construction are selected so that the imaging device is operable in two different wavelength ranges, so that a dual-wavelength imaging sensor and appropriate filters may be used to permit viewing of the scene in different wavelength ranges.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is a ray-path drawing of the refractive imager in its long focal length, narrow field of view (NFOV) form;

FIG. 3 is a ray-path drawing of the refractive imager in its short focal length, wide field of view form (WFOV); and FIG. 4 is an optical prescription for a preferred embodiment of the refractive imager.

DETAILED DESCRIPTION OF THE INVENTION

Figure 1:
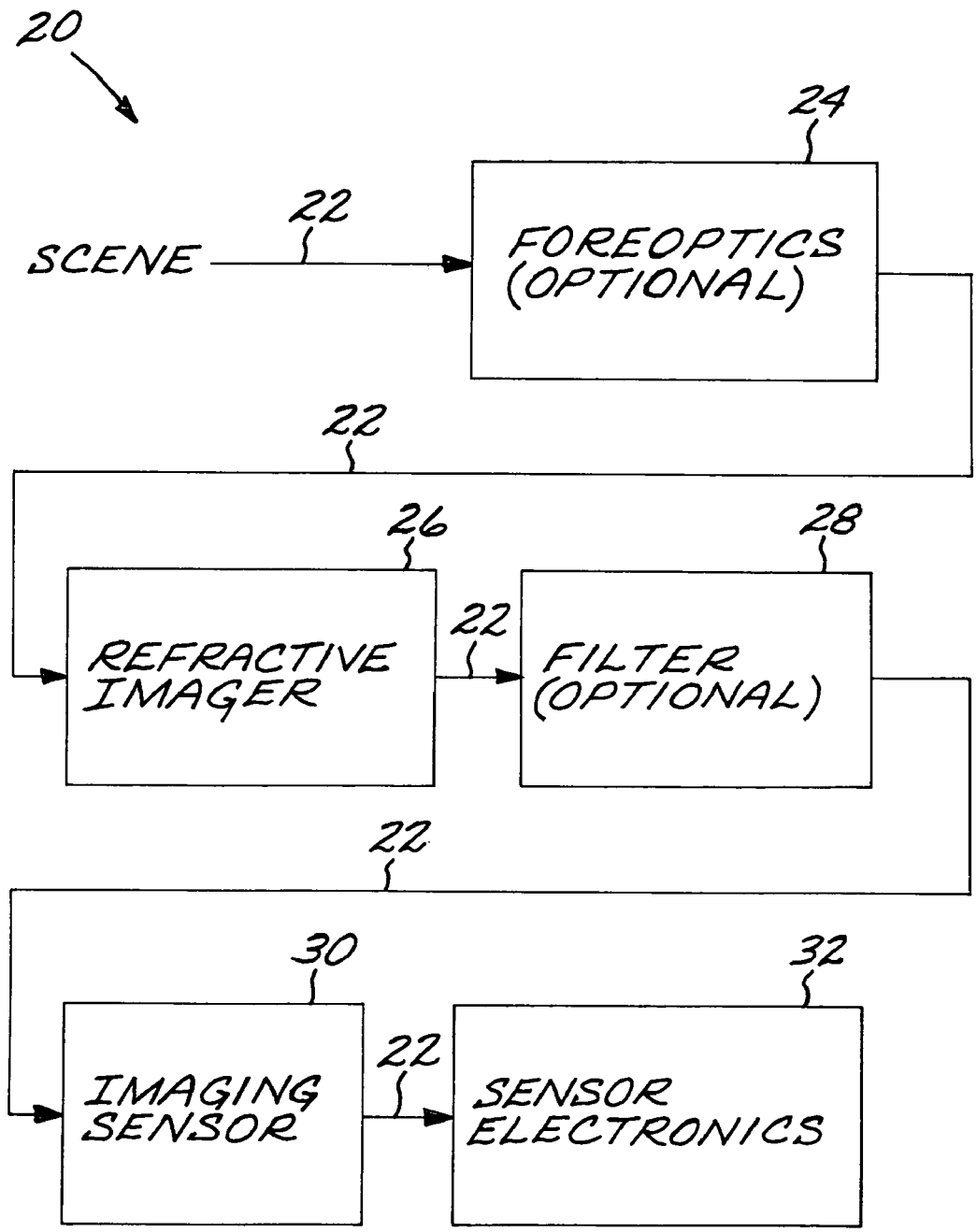
FIG. 1 is a schematic block diagram of an imaging device.

FIG. 1 schematically depicts an imaging device 20. A light beam travels on an optical path 22 from a scene to the imaging device 20. The optical path 22 enters optional foreoptics 24, which may be a reflective telescope, a refractive telescope, or other operable optical device. The foreoptics 24 is preferably an afocal optical device. A single-field-of-view reflective telescope that may be used as the foreoptics 24 is described in U.S. Pat. No. 3,674,334, whose disclosure is incorporated by reference. A dual-field of view refractive telescope that may be used as the foreoptics 24 is described in U.S. Pat. No. 4,989,962, whose disclosure is incorporated by reference.

The light from the foreoptics 24 travels on the optical path 22 to a refractive imager 26. The refractive imager 26 forms an image, and is distinct from an afocal optical device that does not form an image. The preferred form of the refractive imager 26 will be described subsequently. The optical path 22 is imaged by the refractive imager 26, through an optional spectral filter 28, onto an imaging sensor 30. The imaging sensor 30 may be of any operable type, but is preferably a focal plane array (FPA) sensor that operates in the desired imaging wavelength range. Most preferably, the imaging sensor 30 operates in two distinct wavelength ranges. In the embodiment of most interest, the imaging sensor 30 is operable in both the medium-wavelength infrared (MWIR, 3–5 micrometers) and long-wavelength infrared (LWIR, 8–12 micrometers) ranges, or subranges within these broad ranges. The imaging sensor 30 may be, for example, of the HgCdTe type, which operates in these two wavelength ranges. Such dual-wavelength infrared sensors are known in the art and are described, for example, in U.S. Pat. No. 5,583,338, whose disclosure is incorporated by reference. The output signal of the imaging sensor 30 is provided to sensor electronics 32 for signal conditioning and analysis, as needed.

FIGS. 2–3 depict in greater detail a preferred form of the refractive imager 26 that lies in the optical path 22. The refractive imager 26 includes a first lens group 40 that forms an intermediate image 42 of the scene imaged at an entry pupil 43 (which coincides with the exit pupil of the foreoptics 24, where present) at a location on the optical path 22. The first lens group 40 comprises a first-lens-group positive-power lens 44, and a first-lens-group negative-power lens 46. The first-lens-group positive-power lens 44 lies on the optical path 22 between the scene and the first-lens-group negative-power lens 46.

The refractive imager 26 further includes a second lens group 48 that relays the intermediate image 42 to a final image surface 50 that lies on the optical path 22. (The imaging sensor 30 lies at the final image surface 50.) The first lens group 40 lies on the optical path 22 between the entry pupil 43 and the second lens group 48. The second lens group 48 comprises a second-lens-group negative-power lens 52 and a second-lens-group positive-power lens 54. The second-lens-group positive-power lens 54 lies on the optical path 22 between the second-lens-group negative-power lens 52 and the final image surface 50.

A third lens group 56 may be selectively and switchably inserted into the optical path 22 between the first lens group 40 and the second lens group 48, and selectively and switchably removed from the optical path 22. In practice, the third lens group 56 may be mounted on a controllable mechanism 57 such as a rotating or sliding mechanism that controllably moves the third lens group 56 into the optical path 22 or removes it from the optical path 22. The third lens group 56 is shown in phantom lines in the long focal length, narrow field of view (NFOV) form of FIG. 2 to indicate that it is removed from the optical path 22 in that drawing, and is shown as inserted into the optical path 22 in the short focal length, wide field of view (WFOV) form of FIG. 3.

The third lens group 56 comprises a third-lens-group positive-power lens 58. The third-lens-group positive-power lens 58 lies on the optical path 22, preferably between the first lens group 40 and the intermediate image 42, when the third lens group 56 is inserted into the optical path 22. The third lens group 56 also includes a third-lens-group negative-power lens 60. The third-lens-group negative-power lens 60 lies on the optical path 22, preferably between the intermediate image 42 and the second lens group 48, when the third lens group 56 is inserted into the optical path 22.

This preferred embodiment has the important advantage that the location of the final image surface 50 along the optical path 22 is unchanged when the third lens group 56 is inserted into the optical path 22 to achieve the short focal length, wide field of view form of FIG. 3, and when the third lens group 56 is removed from the optical path 22 to achieve the long focal length, narrow field of view form of FIG. 2. The imaging sensor 30, a cold stop 62 of a cold shield 64, an exit pupil 66 of the refractive imager 26 that is coincident with the location of the cold stop 62, and the cold shield 64 that surrounds and maintains the imaging sensor 30 and the cold stop 62 at cryogenic temperature all remain stationary when the third lens group 56 is moved into and out of the optical path 22. The entrance pupil 43 of the refractive imager 26 is imaged at the exit pupil 66 of the refractive imager 26 by the lens groups.

In the preferred embodiment wherein the imaging device 20 is operable in the MWR and/or the LWIR wavelength ranges, it is preferred that at least one, and preferably both, of the first-lens-group positive-power lens 44 and the second-lens-group positive-power lens 54 are made of zinc selenide (ZnS, refractive index $\eta$ of about 2.25). It is further preferred that at least one, and preferably both, of the first-lens-group negative-power lens 46 and the second-lens-group negative-power lens 52 are made of barium fluoride (BaF$_2$, $\eta$ of about 1.44). It is further preferred that the third-lens-group positive-power lens 58 is made of Amtir1 (having a nominal composition of Ge$_{33}$As$_{12}$Se$_{55}$ and $\eta$ of about 2.5), and the third-lens-group negative-power lens 60 is made of arsenic trisulfide (having a nominal composition of $As_2S_3$ and η of about 2.4). The values of the refractive index η vary as a function of wavelength, and a virtue of the design of the optics of the present imaging device is that it compensates for this variation and allows the imaging device to be used over two wavelength ranges such as the MWIR and the LWIR.

The field switching described in relation to FIGS. 2–3 is accomplished by and in the refractive imager 26, which produces an image. This approach is distinct from techniques such as that described in U.S. Pat. No. 4,989,962. In the approach of the '962 patent, the field switching is accomplished in the afocal foreoptics (e.g., the foreoptics 24 of FIG. 1 of the present application), not in imaging optics as in the present approach (e.g., the refractive imager 26 of the present application). Stated alternatively, the optics described in the '962 patent and similar afocal-optical devices is not a refractive imager because it does not form an image.

The present approach may, however, be used in conjunction with field switching in the afocal foreoptics, such as in the '962 patent, to produce four switchable fields of view (i.e., two fields of view in the foreoptics times two fields of view in the refractive imager). Even further switchable fields of view may be obtained by switchably bypassing the foreoptics 24 so that there is no telescope effect and a magnification of unity, for example by removing the foreoptics 24 from the optical path or by directing the optical path around the foreoptics 24 with fold mirrors or other devices having a net optical power of unity, to produce a total of six switchable fields of view (i.e, two fields of view in the foreoptics times two fields of view in the refractive imager, plus two fields of view in the refractive imager with the foreoptics 24 bypassed and thereby removed).

In another approach, the foreoptics may be non-field-switchable, but bypassable to produce four fields of view. The present approach, wherein the refractive imager is field switchable, allows considerable flexibility in switchably selecting the field of view of the imaging device, particularly when used in conjunction with foreoptics whose field of view may be switched.

The present approach has been reduced to practice analytically in a computer simulation using commercially available optics design software such as Code V or Zemax software, for a dual-wavelength imaging device operable in the MWIR and LWIR ranges. FIG. 4 sets forth the optical prescription for this embodiment. In this simulation, the prototype approach was operable as described above.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An imaging device comprising
   a refractive imager lying in an optical path and comprising
      a first lens group that forms an intermediate image of a scene on the optical path, wherein the first lens group comprises
         a first-lens-group positive-power lens, and
         a first-lens-group negative-power lens;
      a second lens group that relays the intermediate image to a final image surface on the optical path, wherein the second lens group comprises
         a second-lens-group negative-power lens, and
         a second-lens-group positive-power lens; and
      a third lens group that may be selectively inserted into the optical path between the first lens group and the second lens group and selectively removed from the optical path, wherein the third lens group comprises
         a third-lens-group positive-power lens, and
         a third-lens-group negative-power lens, wherein a location of the final image surface along the optical path is unchanged when the third lens group is inserted into the optical path and when the third lens group is removed from the optical path.

2. The imaging device of claim 1, further including a foreoptics positioned on the optical path between the scene and the first lens group.

3. The imaging device of claim 1, further including a field-switchable foreoptics positioned on the optical path between the scene and the first lens group.

4. The imaging device of claim 1, wherein locations of an exit pupil and a cold stop along the optical path are unchanged when the third lens group is inserted into the optical path and when the third lens group is removed from the optical path.

5. The imaging device of claim 1, wherein a location of an exit pupil, a cold stop, and a final image surface are unchanged when the third lens group is inserted into the optical path and when the third lens group is removed from the optical path, for light wavelengths in the medium-wavelength infrared range and the long-wavelength infrared range.

6. The imaging device of claim 1, further including an imaging sensor positioned at the final image surface.

7. The imaging device of claim 1, wherein the first-lens-group positive-power lens lies on the optical pat between the scene and the first-lens-group negative-power lens.

8. The imaging device of claim 1, wherein the second-lens-group positive-power lens lies between the second-lens-group negative-power lens and the final image surface.

9. The imaging device of claim 1, wherein the third-lens-group positive-power lens lies on the optical path between the first lens group and the intermediate image, when the third lens group is inserted into the optical path.

10. The imaging device of claim 1, wherein the third-lens-group negative-power lens lies on the optical path between the intermediate image and the second lens group, when the third lens group is inserted into the optical path.

11. The imaging device of claim 1, wherein at least one of the first-lens-group positive-power lens and the second-lens-group positive-power lens is made of zinc selenide.

12. The imaging device of claim 1, wherein both the first-lens-group positive-power lens and the second-lens-group positive-power lens are made of zinc selenide.

13. The imaging device of claim 1, wherein at least one of the first-lens-group negative-power lens and the second-lens-group negative-power lens is made of barium fluoride.

14. The imaging device of claim 1, wherein both the first-lens-group negative-power lens and the second-lens-group negative-power lens are made of barium fluoride.

15. The imaging device of claim 1, wherein the third-lens-group positive-power lens is made of a material having a nominal composition of $Ge_{33}As_{12}Se_{55}$ and a refractive index of about 2.5.

16. The imaging device of claim 1, wherein the third-lens-group negative-power lens is made of arsenic trisulfide.

17. An imaging device comprising
   a refractive imager lying in an optical path and comprising a first lens group that forms an intermediate image of a scene on the optical path, wherein the first lens group comprises
   a first-lens-group positive-power lens, and
   a first-lens-group negative-power lens, wherein the first-lens-group positive-power lens lies on the optical pat between the scene and the first-lens-group negative-power lens;
a second lens group that relays the intermediate image to a final image surface on the optical path, wherein the second lens group comprises
   a second-lens-group negative-power lens, and a second-lens-group positive-power lens, wherein the second-lens-group positive-power lens lies between the second-lens-group negative-power lens and the final image surface;
a third lens group that may be selectively inserted into the optical path between the first lens group and the second lens group and selectively removed from the optical path, wherein the third lens group comprises
   a third-lens-group positive-power lens, wherein the third-lens-group positive-power lens lies on the optical path between the first lens group and the intermediate image, when the third lens group is inserted into the optical path, and
   a third-lens-group negative-power lens, wherein the third-lens-group negative-power lens lies on the optical path between the intermediate image and the second lens group, when the third lens group is inserted into the optical path; and,
a dual-wavelength imaging sensor located at the image surface, wherein the dual-wavelength imaging sensor is operable in a subrange of the 3–5 micrometer medium wavelength infrared range and a subrange of the 8–12 micrometer long wavelength infrared range, and wherein the materials of construction of the first lens group, the second lens group, and the third lens group are selected such that light of the subrange of the medium wavelength infrared range and the subrange of the long wavelength infrared range are both imaged onto the final image surface.

18. The imaging device of claim 17, further including a telescope positioned on the optical path between the scene and the first lens group.

19. The imaging device of claim 17, wherein a location of the final image surface along the optical path is unchanged when the third lens group is inserted into the optical path and when the third lens group is removed from the optical path.

20. The imaging device of claim 17, wherein both the first-lens-group positive-power lens and the second-lens-group positive-power lens are made of zinc selenide.

21. The imaging device of claim 17, wherein both the first-lens-group negative-power lens and the second-lens-group negative-power lens are made of barium fluoride.

22. The imaging device of claim 17, wherein the third-lens-group positive-power lens is made of a material having a nominal composition of $Ge_{33}As_2Se_5$ and a refractive index of about 2.5, and the third-lens-group negative-power lens is made of arsenic trisulfide.

23. An imaging device comprising
a refractive imager lying in an optical path and comprising
   a first lens group that forms an intermediate image of a scene on the optical path, wherein the first lens group comprises
      a first-lens-group positive-power lens, and
      a first-lens-group negative-power lens;
   a second lens group that relays the intermediate image to a final image surface on the optical path, wherein the second lens group comprises
      a second-lens-group negative-power lens, and
      a second-lens-group positive-power lens; and
   a third lens group that may be selectively inserted into the optical path between the first lens group and the second lens group and selectively removed from the optical path, wherein the third lens group comprises
      a third-lens-group positive-power lens, and
      a third-lens-group negative-power lens; and
   a dual-wavelength imaging sensor located at the final image surface, wherein the dual-wavelength imaging sensor is operable in a subrange of the 3–5 micrometer medium wavelength infrared range and a subrange of the 8–12 micrometer long wavelength infrared range, and wherein the materials of construction of the first lens group, the second lens group, and the third lens group are selected such that light of the subrange of the medium wavelength infrared range and the subrange of the long wavelength infrared range are both imaged onto the final image surface.

24. The imaging device of claim 23, further including a field-switchable foreoptics positioned on the optical path between the scene aud the first lens group.

25. The imaging device of claim 23, wherein a location of the final image surface along the optical path is unchanged when the third lens group is inserted into the optical path and when the third lens group is removed from the optical path.

* * * * *